(12) United States Patent
Oh et al.

(10) Patent No.: US 8,135,403 B1
(45) Date of Patent: Mar. 13, 2012

(54) METHOD AND APPARATUS FOR PROVIDING A PILOT BEACON ON BEHALF OF ONE OR MORE BASE STATIONS

(75) Inventors: Dae-Sik Oh, Overland Park, KS (US); Michael C. DeLaet, Belton, MO (US); Robert C. Pippert, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 595 days.

(21) Appl. No.: 12/266,180

(22) Filed: Nov. 6, 2008

(51) Int. Cl.
*H04W 60/00* (2009.01)

(52) U.S. Cl. ............... 455/435.1; 455/439; 455/436; 370/331; 370/332

(58) Field of Classification Search ........... 455/435.1, 455/439, 436, 414.2; 370/331, 328, 332
See application file for complete search history.

(56) References Cited

U.S. PATENT DOCUMENTS

| | | | |
|---|---|---|---|
| 5,170,485 | A | 12/1992 | Levine et al. |
| 5,737,703 | A | 4/1998 | Byrne |
| 6,052,598 | A | 4/2000 | Rudrapatna et al. |
| 6,243,581 | B1 | 6/2001 | Jawanda |
| 6,438,117 | B1 | 8/2002 | Grilli et al. |
| 6,680,923 | B1 | 1/2004 | Leon |
| 6,757,553 | B1 | 6/2004 | English |
| 6,826,154 | B2 | 11/2004 | Subbiah et al. |
| 7,009,952 | B1 | 3/2006 | Razavilar et al. |
| 7,149,521 | B2 | 12/2006 | Sundar et al. |
| 2001/0036830 | A1 | 11/2001 | Wu et al. |
| 2003/0091021 | A1 | 5/2003 | Trossen et al. |
| 2003/0207683 | A1 | 11/2003 | Lempio et al. |
| 2004/0078828 | A1 | 4/2004 | Parchman et al. |
| 2004/0192294 | A1 | 9/2004 | Pan et al. |
| 2005/0020256 | A1 | 1/2005 | Peikari |
| 2005/0048972 | A1 | 3/2005 | Dorenbosch et al. |
| 2009/0219888 | A1* | 9/2009 | Chen et al. .......... 370/331 |

OTHER PUBLICATIONS

International Search Report from International Application No. PCT/US04/21226, dated Nov. 29, 2005.
Written Opinion from International Application No. PCT/US04/21226, dated Nov. 29, 2005.
Office Action from U.S. Appl. No. 10/779,261, dated Oct. 20, 2005.
Office Action from U.S. Appl. No. 10/779,261, dated Sep. 6, 2006.
Office Action from U.S. Appl. No. 10/779,261, dated Feb. 26, 2007.
Office Action from U.S. Appl. No. 10/779,261, dated Nov. 1, 2007.

(Continued)

*Primary Examiner* — Phuoc Doan (57) ABSTRACT

Disclosed herein is a method and apparatus for providing a pilot-beacon on behalf of one or more base stations, such as one or more femtocells. A pilot-beacon transmitter, separate from the base stations, determines the locations of coverage areas of the base stations and then dynamically configures a pilot-beacon radiation pattern to encompass (approximately) the determined coverage areas. That way, a mobile station may detect the pilot beacon and initiate scanning of coverage provided by the base stations. Optimally, the method can be used to provide a pilot beacon for femtocells, thereby avoiding the need for the femtocells to include pilot beacon transmission functions and thus possibly decreasing the cost of the femtocells. The pilot-beacon transmitter or another entity may also be configured to receive and forward GPS signals to the base stations, possibly offsetting GPS timing based on measured delays for communication with the base stations.

14 Claims, 3 Drawing Sheets

OTHER PUBLICATIONS

Office Action from U.S. Appl. No. 10/779,261, dated Jan. 28, 2008.
Office Action from U.S. Appl. No. 10/779,261, dated May 12, 2008.

U.S. Appl. No. 10/779,261, filed Feb. 13, 2004.
U.S. Appl. No. 11/781,829, filed Jul. 23, 2007.

* cited by examiner

METHOD AND APPARATUS FOR PROVIDING A PILOT BEACON ON BEHALF OF ONE OR MORE BASE STATIONS

BACKGROUND

In a typical cellular wireless communication system, an area is divided into cells and cell sectors, each defined by a radiation pattern (on a particular frequency) from a respective base station or "base transceiver station". Each base station is then typically connected with core network equipment that functions to provide connectivity with a transport network such as the public switched telephone network (PSTN) or the Internet for instance, and that may function to control base station operation and handoff of served client devices from one base station to another. Such equipment may include a controller referred to as a base station controller (BSC) or a radio network controller (RNC). Further, the controller may be coupled with a switch that connects with the PTSN and/or a gateway such as a packet data serving node (PDSN) that connects with a packet-switched network such as the Internet. Conveniently with this arrangement, a cell phone or other wireless client device (generally "mobile station") that is positioned within the coverage area of a given sector can communicate over an air interface with the base station and in turn via the core network equipment with entities on the transport network.

Mobile stations and base stations generally communicate with each other over a radio frequency (RF) air interface according to a defined air interface protocol, examples of which include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. Such air interface communication typically occurs on a frequency known as a "carrier" (which may actually be a pair of frequencies, one for communications from the base station to the mobile station, and another for communication from the mobile station to the base station). On such a carrier, the base station may emit a pilot signal, which is a control signal that a mobile station may detect as an indication of base station coverage. In particular, as the mobile station moves into the coverage of a base station and is operating on the base station's carrier, the mobile station may detect the base station's pilot signal. In response, the mobile station may then hand off to operate in the indicated coverage area.

A wireless service provider typically operates numerous base stations in a given geographic region, to provide robust air interface coverage as mobile stations move from one location to another. These cellular base stations are usually not associated with any subscriber or small group of subscribers in particular; rather, they are usually placed in publicly-accessible locations designed so that their coverage blankets cities, rural areas, etc. to be used by the service provider's customers generally. As such, these types of base stations are generally known as "macro base stations," and the network that they collectively form, or to which they belong, is generally known as a "macro network."

Many macro-network subscribers, including private consumers and small businesses, among others, in addition to having wireless service (which may include data service) for their mobile station(s), may also have high-speed ("broadband") Internet access through another communication channel. This other channel may be cable-modem service, digital-subscriber-line (DSL) service, satellite-based Internet service, and/or some other type of connection. In an exemplary arrangement, a user may have a cable modem connected (a) via coaxial cable to the cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to devices such as laptop computers, digital video recorders (DVRs), appliances, and/or any other computing devices or their wireless network adapters.

To address gaps in macro-network coverage (e.g. poor in-building coverage) and for other reasons, macro-network providers may offer their subscribers private base station devices known as 'femtocells," (also sometimes referred to as picocells, ubicells, microcells, or as femto-, pico-, ubi-, or micro-base stations or base transceiver stations), which are essentially small, low-power, low-capacity, and low-cost versions of a macro base station. As a general matter, a femtocell, which may be approximately the size of a desktop phone or WiFi access point, may communicate (through a wired or wireless link) with the user's broadband router and may establish a virtual private network (VPN) connection via the Internet with the wireless service provider's core network (e.g., with a femtocell controller on the wireless service provider's network). Further, the femtocell may include a wireless communication interface that is compatible with the user's mobile stations and that is arranged to serve the mobile station in much the same way that a macro base station does, providing a pilot signal and so forth. With a femtocell positioned in a location where macro network coverage may be poor or unavailable, a user's mobile station can thus be served by the femtocell in much the same way that the mobile station would be served by a macro base station when within coverage of the macro network.

To avoid interference with macro network communication, a femtocell may operate on a different carrier than that used by macro base stations. Further, to facilitate handoff of mobile stations from the macro network to a femtocell, the femtocell may emit a pilot "beacon" on the carrier frequency of the nearby macro network. The pilot beacon includes administrative messages and parameters that mobile stations can use to connect with the femtocell and thus serves to inform a mobile station that the mobile station may begin scanning for coverage on the carrier of the femtocell. Thus, when a mobile station is operating in the macro network and approaches the coverage of a femtocell, the mobile station may detect the femtocell's pilot beacon and responsively begin scanning the femtocell's carrier in search of a pilot signal to facilitate handoff to the femtocell.

A typical femtocell also includes a Global Positioning System (GPS) receiver for use in receiving and decoding GPS satellite signals. GPS signals may be used in a well known manner to determine the location of the femtocell, and the GPS-determined location of the femtocell may be used as a basis to authorize operation of the femtocell. In particular, upon startup, the femtocell may report its location via the broadband connection to the wireless service provider's core network, and an entity on the wireless service provider's network may determine whether the femtocell is allowed to operate at that location. If so, the entity may allow the femtocell to operate. Or if not, the entity may block operation of the femtocell.

Overview

An enterprise (such as a company, university, household, or other organization) may operate multiple femtocells on a broadband enterprise network, strategically positioning the femtocells at various locations throughout a building or campus and connecting each femtocell to the enterprise network. Each femtocell may operate in largely the manner noted above, to serve mobile stations that come within the femtocell's coverage, with the femtocell having a VPN connection with the wireless service provider's core network via the enterprise network and the Internet.

Each femtocell on the enterprise network would likely provide a pilot beacon as noted above. In particular, each femtocell would emit a pilot beacon on the macro network carrier, to facilitate handoff of mobile stations from the macro network to the femtocell. Unfortunately, however, including pilot beacon functionality in a femtocell adds to the overall cost of the femtocell, as it would generally be necessary to include a separate pilot beacon transmitter that operates on the macro network carrier, and such a transmitter could be relatively costly.

Disclosed herein is a method to help reduce the cost of femtocells, by helping to avoid the need for the femtocells to include pilot beacon functionality. The method involves providing a separate pilot-beacon transmitter that will transmit a pilot beacon on behalf of the femtocell.

For maximum effect, such a pilot-beacon should substantially cover the area where the femtocell provides coverage, so that mobile stations detecting the pilot beacon can successfully begin to scan for femtocell coverage. To achieve that goal, the pilot-beacon transmitter may be configured to determine the actual or relative location of the femtocell coverage area and to then dynamically radiate its pilot beacon in a manner designed to cover the femtocell coverage area.

For example, the pilot-beacon transmitter may determine the actual location of the femtocell and the femtocell's transmission power level (if not already known) and thus approximate scope of femtocell coverage, and the pilot-beacon transmitter may then adjust its antenna radiation pattern to cover that femtocell coverage area to the extent possible. As another example, the pilot-beacon transmitter may determine the distance between it and the femtocell (e.g., based on round trip signal delay measurements) and the femtocell's transmission power (if not already known) and may thus determine the approximate distance of the farthest point of the femtocell's coverage from the pilot-beacon transmitter, and the pilot-beacon transmitter may then adjust the power level of a largely omni-directional pilot-beacon to extend approximately to that farthest distance.

In practice, the pilot-beacon transmitter may be connected by a communication link (wired and/or wireless) with the femtocell, so that the pilot-beacon transmitter can receive configuration information from the femtocell to enable the pilot-beacon transmitter to adjust its pilot-beacon radiation pattern appropriately. For instance, the pilot-beacon transmitter may sit within the communication path between the femtocell and the wireless service provider's core network, as part of a network router or gateway for instance. Through that communication path, the pilot-beacon transmitter may engage in communication with the femtocell, to receive information about the femtocell's location, signal strength, or the like. The pilot-beacon transmitter may request and receive this information from the femtocell upon detecting the connection of the femtocell, or the femtocell may programmatically report the information to the pilot-beacon transmitter.

Optimally, in an enterprise network or other arrangement where numerous femtocells are provided in various locations, a single pilot-beacon transmitter can operate to provide a pilot beacon on behalf of a group of femtocells, with its pilot beacon coverage dynamically structured to cover the locations of the various femtocells. To accomplish this, the pilot-beacon transmitter may carry out the above process respectively for each femtocell but may define its pilot-beacon radiation pattern to cover the collection of femtocell coverage areas for the group of femtocells.

In one arrangement, for instance, the pilot-beacon transmitter may be provided as or at an enterprise gateway through which various enterprise femtocells communicate with the wireless service provider's core network. The gateway may function as a network router or may be provided as a separate entity on the network, with communications made to pass through the gateway on their way between the femtocells and the wireless service provider's core network. Such a gateway may be equipped with pilot-beacon transmission circuitry and an antenna structure and may apply the above process to dynamically generate a pilot-beacon radiation pattern designed to cover the coverage areas of the various enterprise femtocells. Optimally, the gateway may detect the addition of a femtocell on the enterprise network (e.g., if the gateway is the assignor of IP addresses and thus assigns an IP address to a newly added femtocell) or removal of a femtocell from the enterprise network. When any such change in femtocells occurs, the gateway may then apply the above process to newly configure its pilot-beacon radiation pattern, so as to best cover the coverage areas of the femtocells currently in operation.

In another respect, the pilot-beacon transmitter (e.g., a gateway where the pilot-beacon transmitter function is located) may be configured with GPS-receive functionality to receive GPS signals on behalf of one or more femtocells and to transmit the received GPS signals to the femtocells. The femtocells can then advantageously use the GPS signals for location determination and can use GPS time indicated in the signals as a basis to provide control channels (e.g., pilot and paging channels) synchronized with other base stations, so as to facilitate mobile station handoff between base stations. This would be particularly advantageous in a situation where the femtocells are located indoors and do not have a clear enough view of the sky to receive GPS signals. Furthermore, the cost of femtocells can be additionally reduced by avoiding the need to include a GPS reception antenna and circuit in each femtocell.

An issue that can arise when GPS signals are received by such an entity remote from the device whose location is to be determined, however, is that the GPS time indicated in the GPS signals as received by the femtocells may be incorrect, due to the delay in transmitting the GPS signals to the femtocells. Further, the extent to which the GPS timing would be incorrect for various femtocells would vary, as the delay in transmitting the GPS signals to the femtocells may vary. A solution to this problem, as presently contemplated, is to measure the time delay between the entity receiving the GPS signals (here, the pilot-beacon transmitter (e.g., gateway)) and the entity where the received signals are being sent (the femtocell), and to adjust the GPS time in the signals accordingly.

For instance, if an enterprise gateway is equipped with a GPS antenna to receive GPS signals on behalf of various femtocells, the gateway may be configured to determine signal transmission delay between it and each femtocell respectively, and the gateway may adjust the GPS time in the GPS signals sent to that femtocell in accordance with the determined delay. In practice, for example, using known techniques for measuring delay (e.g., pinging), the gateway may measure round trip signal delay between it and a given femtocell. If that delay exceeds a threshold, the gateway may then set itself to adjust the timing of GPS signals that the gateway sends to that femtocell, in accordance with the measured delay. Carrying out this function separately for each femtocell, the gateway may thereby adjust the GPS timing differently for various, in accordance with the different transmission delays between the femtocells and the gateway.

These and other aspects and advantages of the present method will become apparent to those of ordinary skill in the art by reading the following detailed description with reference where appropriate to the accompanying drawings.

DETAILED DESCRIPTION

Figure 1:
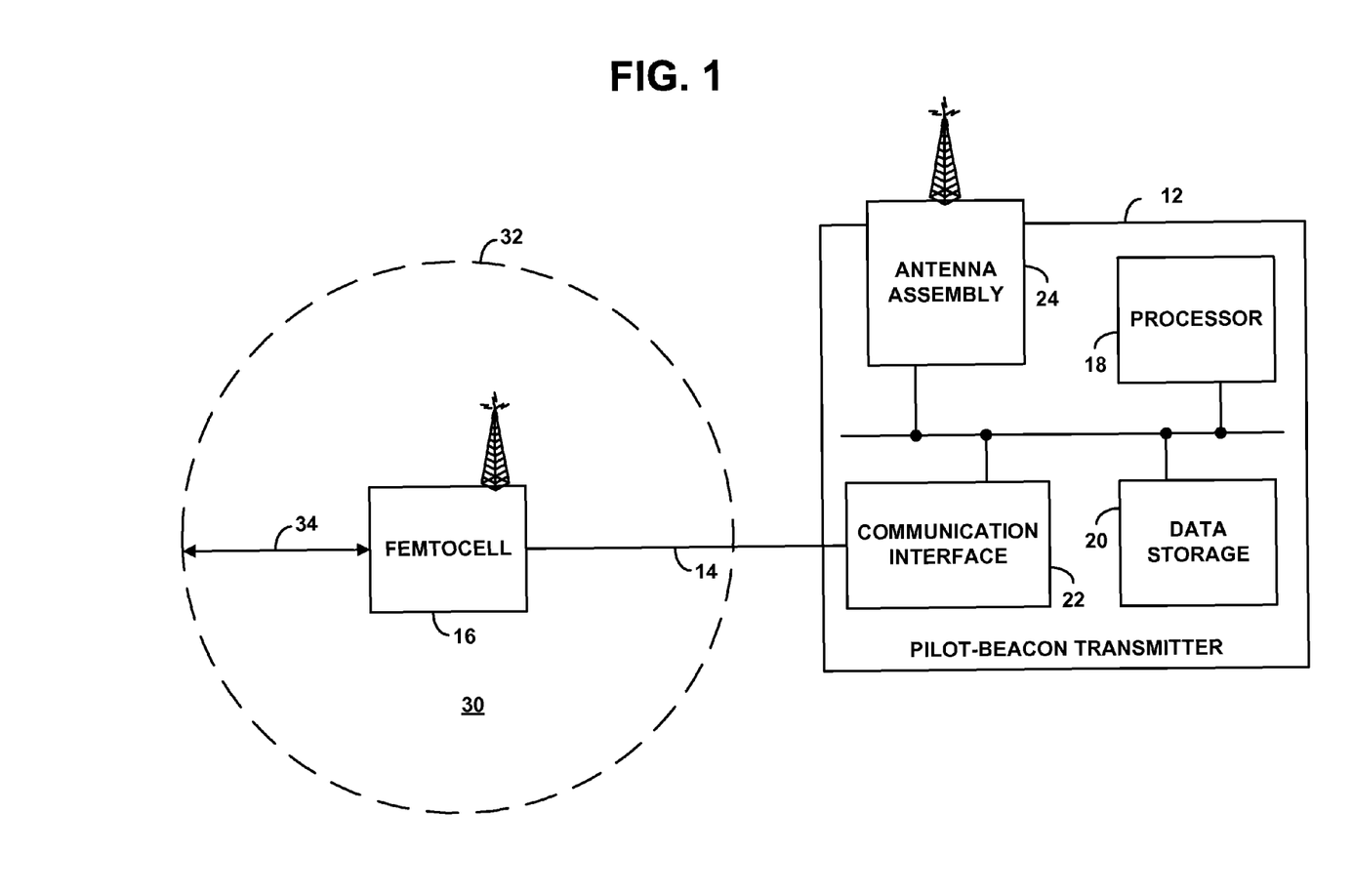
FIG. 1 is a simplified block diagram depicting a pilot-beacon transmitter and a femtocell.

Referring to the drawings, FIG. 1 is a simplified depiction of a pilot-beacon transmitter 12 arranged to operate in accordance an exemplary embodiment of the present method. The figure illustrates the pilot-beacon transmitter 12 having a communication link 14 with a femtocell 16, which could just as well be any base station, whether private or public. The communication link 14 can be a wired and/or wireless link. For instance, if the pilot-beacon transmitter 12 is provided as a function of an enterprise gateway as discussed above, the communication link 14 could comprise an enterprise network such as an Ethernet based Local Area Network (LAN), to which the gateway and femtocell 16 are coupled by wired and/or wireless links. Other arrangements are possible as well.

As shown, the pilot-beacon transmitter includes a processor 18, data storage 20, a communication interface 22, and an antenna assembly 24. The processor 18 may comprise one or more general purpose and/or special purpose processors. And the data storage 20 may comprise one or more volatile and/or non-volatile storage components, such as optical, magnetic, or organic memory for instance. The data storage preferably holds machine language instructions executable by the processor 18 to carry out or control implementation of various functions described herein, such as determining femtocell coverage location and manipulating pilot-beacon coverage to best extend over the coverage areas of one or more femtocells. Further, the data storage is preferably arranged to hold data such as a specification of the location and orientation of the pilot-beacon transmitter and specifications of locations, power levels, and other information regarding one or more femtocells such as femtocell 16. The communication interface 22 functions to connect with link 14, to enable pilot-beacon transmitter 12 to communicate with femtocell 16.

The antenna assembly may include one or more antennas, power amplifiers, and associated circuitry. And preferably, the assembly is programmatically controllable to dynamically vary its radiation pattern so as to have the beacon span the coverage areas of one or more femtocells to the extent feasible. In one arrangement, the antenna assembly may provide largely omni-directional coverage and may have programmatically controllable power output so as to dynamically vary the reach of its radiation pattern. In another arrangement, the antenna assembly may have directional components, each possibly with separately adjustable amplitude, tilt, and azimuth, so that the radiation pattern can be more granularly adjusted to point in one or more specific directions, with desired beamwidth, desired reach, and desired tilt. Such an arrangement could be provided by a phased array antenna structure, or by a collection of separate antennas each pointing in a particular direction and having respectively controllable amplitude and tilt. Numerous other arrangements are possible as well, in line with the method.

Femtocell 16 as shown in FIG. 1 radiates to define a femtocell coverage area 30. Although the radiation pattern of the femtocell will likely take a form other than a circle, the radiation pattern can be represented approximately by a circle 32 having a radius 34 representing the theoretical range of the femtocell, such as its average or farthest reach. Radius 34 corresponds generally with the transmission power level of the femtocell, with a higher transmission power providing a larger coverage area radius, and vice versa. Empirical data based on observations of femtocells in operation may define correlations between transmission power levels and typical/approximate coverage radii. For the present method, that correlation data can be stored in the data storage 20 of pilot-beacon transmitter 12, so that the pilot-beacon transmitter can determine the approximate radius of coverage around a femtocell's location, given knowledge of the femtocell's transmission power level. In practice, femtocells may have variable transmission power or may have predefined/fixed transmission power.

Figure 2:
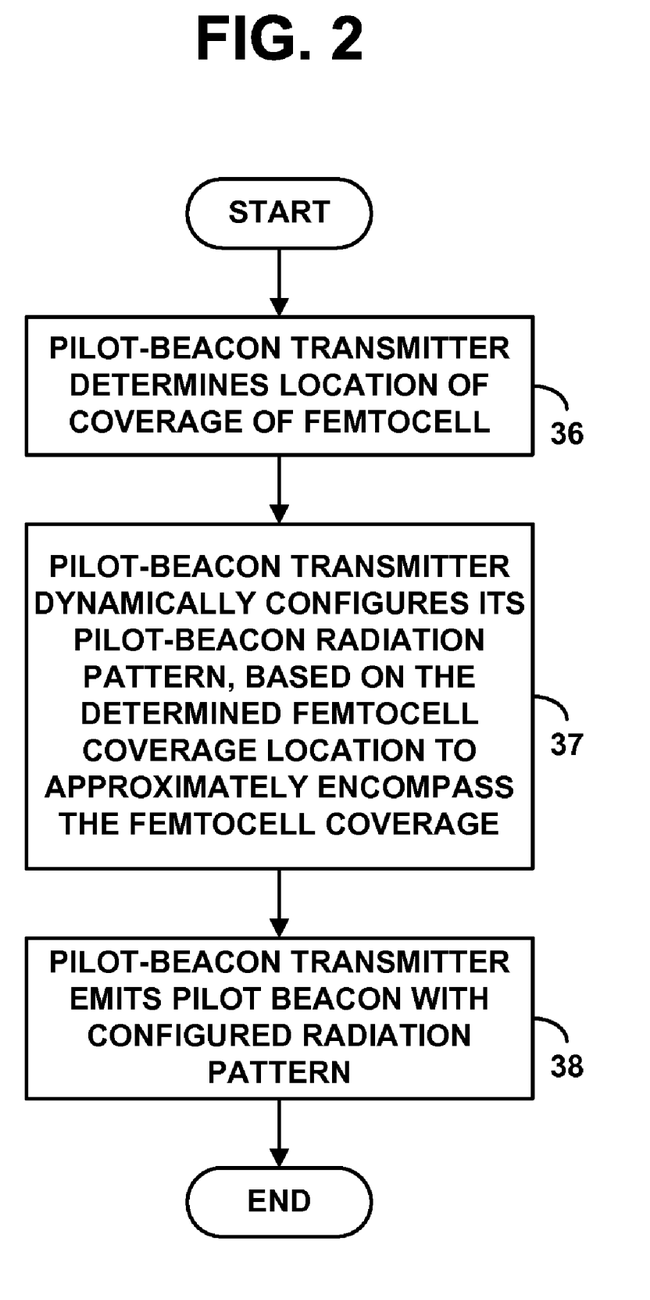
FIG. 2 is a flow chart depicting process steps that can be implemented in accordance with the method.

FIG. 2 is a flow chart depicting steps that can be carried out by pilot-beacon transmitter 12 in accordance with the present method, to dynamically set or adjust the pilot-beacon radiation pattern of pilot-beacon transmitter 12 so as to cover (approximately or completely) the coverage area of femtocell 16.

As shown at step 36, the pilot-beacon transmitter 12 first determines the location of coverage provided by the femtocell 16. This function may vary depending on whether the pilot-beacon transmitter provides an omni-directional pilot beacon, in which case the issue is how far away the farthest edge of the femtocell coverage is from the pilot-beacon transmitter, or whether the pilot-beacon transmitter provides some level of beamforming functionality, in which case the issue may additionally include what direction the femtocell coverage area is from the pilot-beacon transmitter. In the latter case, the pilot-beacon transmitter can be at a fixed orientation, so that beamforming can be used to direct its beacon radiation to the femtocell coverage area.

The pilot-beacon transmitter may determine the location of the femtocell's coverage area in various ways, through communication with the femtocell over link 14. To facilitate this, the femtocell 16 preferably includes a programmed processor and communication interface and can thus communicate via link 14 with the pilot-beacon transmitter 12. Communications between these two entities can be by push or pull, or through observation of other communications carrying the relevant information. For instance, the pilot-beacon transmitter can send a query to the femtocell asking for particular information, and the femtocell can respond. Alternatively, the femtocell can report information autonomously to the pilot-beacon transmitter. Still alternatively, if the pilot-beacon transmitter sits in a communication path through which communications between the femtocell and another entity (e.g., the wireless service provider's core network) pass, such as in a network router, the pilot-beacon transmitter may inspect communications passing over that path, to obtain the relevant information. The protocol used for communication/messaging between the pilot-beacon transmitter and the femtocell is not critical; examples include HTTP, and SMPP, among others.

Optimally, the pilot-beacon transmitter would determine the femtocell's coverage area location when the femtocell is powered-on. At that time, the femtocell might send a signal to the pilot-beacon transmitter, or through an entity at which the pilot-beacon transmitter is located, which would alert the pilot-beacon transmitter to the new presence/operation of the femtocell. The femtocell may generate that signal to provide the pilot-beacon transmitter with the femtocell's information, or the femtocell may generate the signal to register with the pilot-beacon transmitter, such as to obtain a network address for instance.

In one embodiment of the method, the pilot-beacon transmitter may determine the relative location of the femtocell and the transmission power level of the femtocell. The relative location may be a distance between the femtocell and the pilot-beacon transmitter. The pilot-beacon transmitter may determine that distance by measuring round-trip signal delay between the pilot-beacon transmitter and the femtocell, such as by pinging the femtocell, and then computing an approximate distance based on half of that signal delay. This distance is a rough approximation, because it is based on an assumption of the speed of signal transmission between the pilot-beacon transmitter and the femtocell, and an assumption that the transmission line connecting the pilot-beacon transmitter to the femtocell is a direct, straight line. In practice, the delay would probably be an overestimate, as the line would not be a direct, straight line.

In addition, the pilot-beacon transmitter would determine the transmission power level of the femtocell, either as a fixed, predefined transmission level known to be used by femtocells generally, or by information from the femtocell or communications with the femtocell. Given the femtocell transmission power level, the pilot-beacon transmitter may then look up in its correlation data to determine a corresponding coverage area radius. The pilot-beacon transmitter may then programmatically add that radius to the determined distance of the femtocell from the pilot-beacon transmitter, in order to compute an approximate distance of the farthest edge of the femtocell's coverage area from the pilot-beacon transmitter.

In another embodiment of the method, the pilot-beacon transmitter may more accurately determine an actual location of the femtocell by receiving an indication of the GPS-determined coordinates of the femtocell. For instance, the femtocell may apply its GPS receiver technology to determine, or cause to be determined, its location, and the femtocell may report that GPS location to the pilot-beacon transmitter. Alternatively, the pilot-beacon transmitter may use a network address or other such characteristic of the femtocell to determine the femtocell's location. For instance, the pilot-beacon transmitter may determine the femtocell's network address (such as by knowing the address if the pilot-beacon transmitter assigned the address, by receiving an indication of the address in a message from the femtocell, or by querying another entity to determine the address). The pilot-beacon transmitter may then query predefined correlation data that correlates network addresses with locations, if such data exists, and to thereby determine the location of the femtocell having the determined network address.

Furthermore, in the event the femtocell is located at a different vertical location than the pilot-beacon transmitter, such as on a different floor of a building for instance, the actual location determined by the pilot-beacon transmitter may include an indication of the altitude or floor level of the femtocell. For instance, using GPS functionality, the femtocell may report its altitude. Or based on a network address or floor information programmed into the femtocell, the femtocell may report information to the pilot-beacon transmitter that enables the pilot-beacon transmitter to determine the height of the femtocell.

Given the femtocell's actual location and a knowledge of the femtocell's own location (which could be provisioned into the pilot-beacon transmitter, or determined through GPS functionality or the like), the pilot-beacon transmitter may compute a geometric distance between itself and the femtocell. Furthermore, as in the above embodiment, the pilot-beacon transmitter may determine the femtocell's transmission power level and thereby determine the femtocell's coverage area radius. Thus, likewise, the pilot-beacon transmitter may programmatically determine a distance from the pilot-beacon transmitter to the far edge of the femtocell's coverage area. Given a knowledge of the actual location of the femtocell, the pilot-beacon may additionally determine the angular orientation of that location from the pilot-beacon transmitter, for directional beamforming purposes.

At step 37 in FIG. 2, once the pilot-beacon transmitter has determined the location of the femtocell's coverage area, the pilot-beacon transmitter dynamically sets or adjusts its pilot beacon radiation pattern to cover, to the extent feasible, the femtocell coverage area. The pilot-beacon transmitter may do this in various ways, again depending on the type of radiation that it provides, such as whether it provides omni-directional coverage or directional coverage.

If the pilot-beacon transmitter provides omni-directional coverage, then the issue may be simply how far the beacon should extend so as to encompass the femtocell coverage area. For this purpose, given the determined distance of the far edge of the femtocell coverage area from the pilot-beacon transmitter, the pilot-beacon transmitter may set its range to be approximately that same distance. To do so, the pilot-beacon transmitter may refer to predefined correlation data that correlates distances of transmission with pilot beacon transmission power levels and may then set its pilot beacon transmission power level to be a level that would be most likely to extend radiation out to the determined distance.

If the pilot-beacon transmitter provides directional coverage, such as with a phased array antenna structure, or separate antennas each serving a particular direction, the pilot-beacon transmitter may use the determined angular orientation of the femtocell from the pilot-beacon transmitter as a basis to programmatically set one or more parameters (e.g., power level, beamwidth, azimuth, tilt, etc.) of the antenna structure, so that the antenna structure emits a radiation pattern directed to cover the femtocell coverage area.

Finally, at step 38, once the pilot-beacon transmitter has dynamically set or adjusted its pilot beacon radiation pattern to approximately encompass the femtocell's coverage area, the pilot-beacon transmitter may usefully emit its pilot beacon with that radiation pattern. That way, a mobile station that comes within coverage of the pilot beacon may detect the beacon and sensibly begin scanning for femtocell coverage.

Although FIG. 1 depicts a single femtocell, the arrangement and process depicted and described above can be readily extended to a scenario where multiple femtocells are in operation, so that the pilot-beacon transmitter would emit a pilot beacon dynamically configured to encompass the coverage areas of the femtocells collectively. This may occur in an enterprise network for instance.

Figure 3:
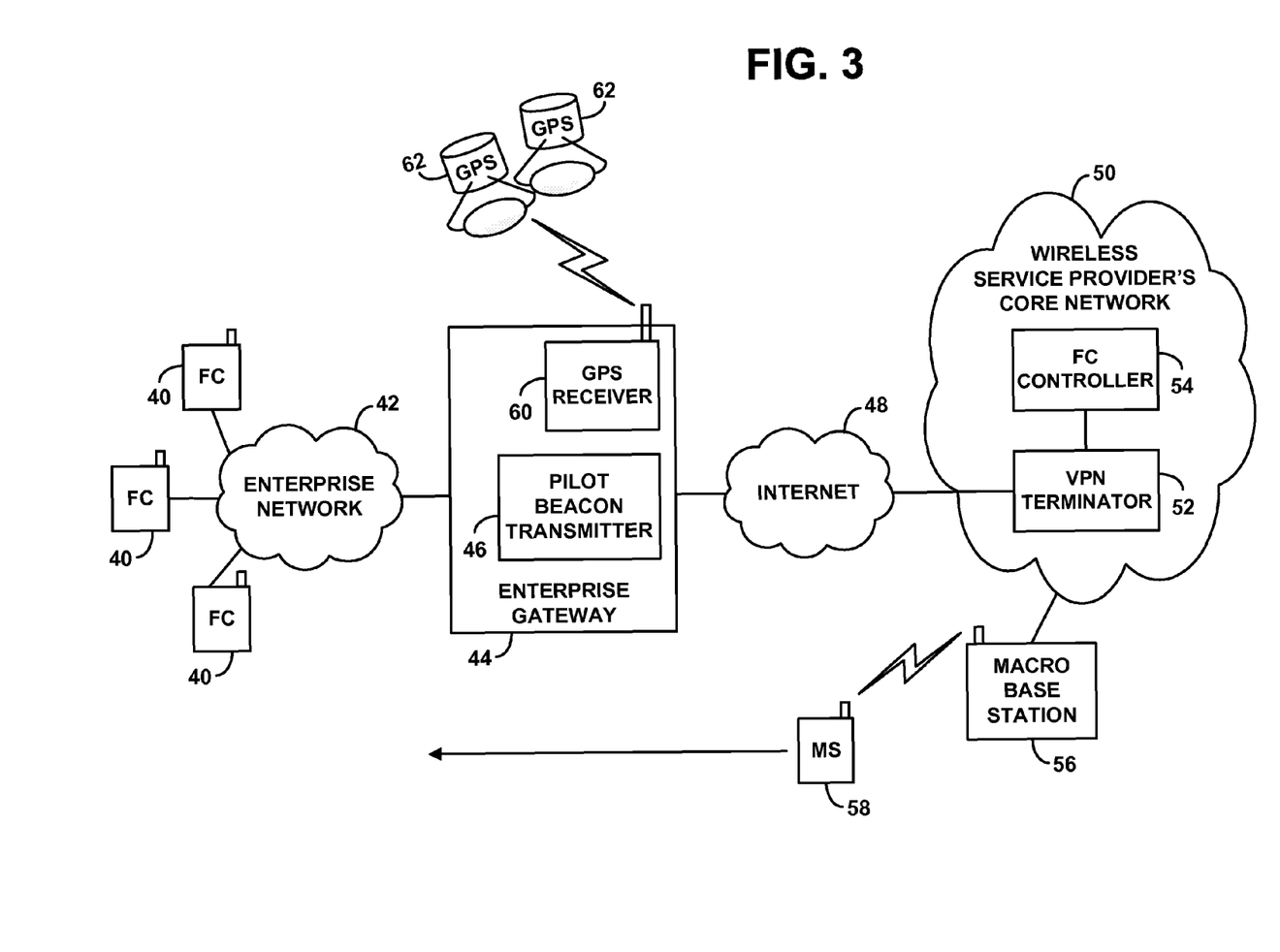
FIG. 3 is a simplified block diagram of an enterprise network arrangement in which a pilot-beacon transmitter functions to dynamically provide a pilot-beacon on behalf of multiple femtocells.

FIG. 3 illustrates a representative enterprise network arrangement. As shown in FIG. 3, a plurality of femtocells 40 sit as nods on an enterprise network 42 (i.e., any network, whether a company network, a home network, or the like). Also sitting as a node on the network is then an enterprise gateway 44, having a pilot-beacon transmitter function 46.

The enterprise gateway is in turn coupled with the Internet 48, which is in turn coupled with a wireless service provider's core network 50, and particularly a VPN terminator 52 that couples with a femtocell controller 54 in the wireless service provider's core network 50. For completeness, the wireless service provider's core network 50 is also shown coupled with or including a representative macro base station 56.

Preferably, each femtocell 40 includes a VPN client programmed to establish a VPN tunnel with the VPN terminator 52 upon femtocell power-on, so that the femtocell can communicate with the wireless service provider's core network 50. This communication preferably passes through the enterprise gateway 44. In practice, the enterprise gateway may function as a router on the enterprise network, possibly an entity that assigns network addresses (e.g., IP addresses) to various nodes on the network, such as to femtocells 40. Through this arrangement, or otherwise, enterprise gateway would be aware when a femtocell is added to the network, and likewise when a femtocell is removed from the network.

FIG. 3 depicts a representative mobile station 58 currently served by macro base station, on a macro carrier frequency, but moving toward the enterprise network. For instance, a user of the mobile station may be entering a corporate campus or household where the enterprise network is located. At issue is then when the mobile station will begin scanning for femtocell coverage.

Applying the above discussion, the pilot-beacon transmitter function 46 of the enterprise gateway 44 will preferably detect the presence of the various femtocells 40 and will dynamically set or adjust its pilot beacon radiation pattern based on the coverage area locations of the various femtocells, to approximately encompass those locations. In particular, the pilot-beacon transmitter function 46 may carry out the above functionality respectively for each femtocell activated on the enterprise network.

If the pilot-beacon transmitter function provides omni-directional beacon coverage, it may set or adjust its transmission power level to radiate far enough to reach the farthest edge of the coverage areas of the femtocells. Optimally, with this arrangement, the enterprise gateway may be positioned somewhat centrally in the enterprise, so that its omni-directional beacon radiation does not extend too far in a direction where there is no femtocell. However, it is understood that some spurious beacon coverage will occur in any event.

If the pilot-beacon transmitter function provides directional beacon coverage, it may set or adjust its transmission power level and other parameters so that its antenna structure radiates with various amplitudes in various directions, encompassing as closely as possible the coverage areas of the various femtocells.

With the benefit of this process, as mobile station 60 approaches the enterprise network, the mobile station will preferably begin to detect the pilot beacon somewhere near where enterprise femtocell coverage begins. Thus, the mobile station may then sensibly begin scanning for femtocell coverage. Upon detecting the presence of a particular enterprise femtocell, the mobile station may then invoke a handoff from the macro network to the femtocell.

As noted above, a pilot-beacon transmitter (e.g., gateway) as presently contemplated may also function as a GPS receiver for one or more femtocells. To facilitate this, pilot-beacon transmitter may include a GPS receiver 60 and may thus receive signals from GPS satellites 62. The pilot-beacon transmitter may then pass those signals along to one or more femtocells. To make up for signal delay added by the transmission between the pilot-beacon transmitter and a given femtocell, the pilot-beacon transmitter may advantageously adjust the GPS time indicated by or in the GPS signals, to offset for the delay in signal communication between the pilot-beacon transmitter and the femtocell. For instance, if the pilot-beacon transmitter has determined a delay of N milliseconds between it and a given femtocell, and if a given GPS signal received by the pilot-beacon transmitter's GPS receiver has a GPS time of M, then the pilot-beacon transmitter may reduce the delay by N to make the GPS time equal to M-N.

That way, when the additional delay of M milliseconds occurs in transmission from the pilot-beacon transmitter to the femtocell, the femtocell will properly read a GPS time offset for that delay. In this manner, the GPS time received by each femtocell will be more accurate, thus enabling the femtocells to provide control channels (e.g., pilot and paging channels) better synchronized with other base stations, to thereby facilitate mobile station handoff between base stations. Further, the femtocells may use the more accurate GPS time to better facilitate GPS location determination.

This GPS signal offset function can also be more generally implemented in any scenario where GPS signals are received by a GPS receiver and then forwarded over a wired or wireless transmission medium to an entity that will use the GPS signals to carry out a function (such as location determination, control signal timing, etc.) By adjusting the GPS time of the GPS signals to account for the transmission delay from the GPS receiver to the entity that will use the signals, more accurate GPS location determination can be achieved, and the more accurate GPS time may be better used in carrying out the function.

It will be understood that numerous variations from this method and arrangement discussed above are possible while remaining with the scope of the claims. For example, where the foregoing discussion explains that certain factors are taken into account when dynamically configuring a pilot-beacon radiation pattern, it will be understood that other factors can be taken into account as well.

We claim:

1. A method of providing a pilot-beacon on behalf of a cellular base station, comprising:
    determining a location of a coverage area of the base station;
    based at least in part on the determined location, dynamically configuring a pilot-beacon radiation pattern to encompass the determined location of the coverage area of the base station, wherein dynamically configuring a pilot-beacon radiation pattern to encompass the determined location of the coverage area of the base station comprises programmatically adjusting one or more parameters of a pilot beacon antenna arrangement based on the determined location of the coverage area of the base station, wherein the one or more parameters are selected from the group consisting of power level, beamwidth, azimuth, and tilt; and
    emitting a pilot beacon with the configured pilot-beacon radiation pattern,
    whereby the pilot-beacon with the pilot-beacon radiation pattern facilitates handoff of a mobile station to the base station.

2. The method of claim 1, wherein the base station is a femtocell.

3. The method of claim 2, wherein the determining, dynamically configuring, and emitting functions are carried out at a gateway through which communications pass between the femtocell and a wireless service provider's core network.

4. The method of claim 3, wherein the gateway is an enterprise gateway.

5. The method of claim 3, wherein at least the determining and dynamically configuring functions are carried out by or under control of a processor programmed with machine language instructions.

6. The method of claim 1, wherein determining a location of a coverage area of the base station comprises determining an actual location of a coverage area of the base station.

7. A method of providing a pilot-beacon on behalf of a cellular base station, comprising:
   determining a location of a coverage area of the base station, wherein determining a location of a coverage area of the base station comprises determining an actual location of a coverage area of the base station, wherein determining an actual location of a coverage area of the base station comprises determining a location of the base station, determining a transmission power level of the base station, determining a base station radiation range based on the determined transmission power level, and determining that the location of the coverage area of the base station extends the determined range from the determined location of the base station;
   based at least in part on the determined location of the coverage area, dynamically configuring a pilot-beacon radiation pattern to encompass the determined location of the coverage area of the base station; and
   emitting a pilot beacon with the configured pilot-beacon radiation pattern,
   whereby the pilot-beacon with the pilot-beacon radiation pattern facilitates handoff of a mobile station to the base station.

8. The method of claim 7, wherein determining the location of the base station comprises determining a GPS location of the base station.

9. The method of claim 7, wherein determining the location of the base station comprises determining a network address of the base station and determining the location of the base station based on the determined network address.

10. A method of providing a pilot-beacon on behalf of a cellular base station, comprising:
    determining a location of a coverage area of the base station, wherein determining a location of a coverage area of the base station comprises determining a distance out to the base station, determining a transmission power level of the base station, determining a base station radiation range based on the determined transmission power level, and determining that the location of the coverage area of the base station extends a total of the distance plus the determined radiation range;
    based at least in part on the determined location, dynamically configuring a pilot-beacon radiation pattern to encompass the determined location of the coverage area of the base station; and
    emitting a pilot beacon with the configured pilot-beacon radiation pattern, whereby the pilot-beacon with the pilot-beacon radiation pattern facilitates handoff of a mobile station to the base station.

11. A method of providing a pilot-beacon on behalf of a cellular base station, comprising:
    determining a location of a coverage area of the base station;
    based at least in part on the determined location, dynamically configuring a pilot-beacon radiation pattern to encompass the determined location of the coverage area of the base station, wherein dynamically configuring a pilot-beacon radiation pattern to encompass the determined location of the coverage area of the base station comprises programmatically adjusting pilot beacon transmission power level to cause pilot beacon transmission range to extend far enough to reach a farthest edge of the determined location of the coverage area of the base station; and
    emitting a pilot beacon with the configured pilot-beacon radiation pattern,
    whereby the pilot-beacon with the pilot-beacon radiation pattern facilitates handoff of a mobile station to the base station.

12. A pilot-beacon transmitter for providing a pilot-beacon on behalf of a plurality of base stations, wherein the base stations are femtocells, the pilot-beacon transmitter comprising:
    a dynamically configurable antenna structure for emitting the pilot-beacon, wherein the antenna structure provides omni-directional pilot-beacon radiation;
    a processor;
    data storage; and
    machine language instructions stored in the data storage and executable by the processor to determine locations of coverage areas of the base stations, and, based at least in part on the determined locations, to dynamically configure the antenna structure so as to provide a pilot-beacon radiation pattern that encompasses the locations of the coverage areas of the base stations, wherein the machine language instructions are executable by the processor to configure a pilot-beacon transmission power level so as to cause the pilot-beacon to reach to a farthest edge of the determined locations of the coverage areas of the base stations,
    wherein the antenna structure then emits the pilot-beacon with the configured pilot-beacon radiation pattern,
    whereby the pilot-beacon with the pilot-beacon radiation pattern facilitates handoff of a mobile station to any of the base stations.

13. The pilot-beacon transmitter of claim 12, provided at or as part of an enterprise gateway through which communications pass between the femtocells and a wireless service provider's core network.

14. The pilot-beacon transmitter of claim 13, wherein the gateway comprises a GPS receiver, wherein the gateway receives GPS signals and passes the GPS signals to the femtocells, and wherein the gateway adjusts a GPS time of at least one such GPS signal based on a signal delay between the pilot-beacon transmitter and the femtocell to which the gateway passes the GPS signal.

* * * * *